United States Patent [19]
Hofseth

[11] Patent Number: 5,829,471
[45] Date of Patent: Nov. 3, 1998

[54] VALVE, PARTICULARLY FOR VACUUM DRAINAGE SYSTEMS

[76] Inventor: Olav Hofseth, Lanagjerdet 6, 6065 Ulsteinvik, Norway

[21] Appl. No.: 569,286

[22] Filed: Dec. 8, 1995

[51] Int. Cl.$^6$ .............................. F16K 3/02; F16K 11/04
[52] U.S. Cl. ................................. 137/205; 4/431; 4/434; 137/625.4; 137/894; 137/907; 251/63; 251/326
[58] Field of Search ..................... 4/431, 434; 137/205, 137/625.4, 907, 894; 251/63, 326

[56] References Cited

U.S. PATENT DOCUMENTS

| | | | |
|---|---|---|---|
| 780,323 | 1/1905 | Campbell | 251/330 X |
| 2,420,849 | 5/1947 | Wilson . | |
| 2,913,012 | 11/1959 | McCurley | 251/330 X |
| 3,316,929 | 5/1967 | Milette | 251/326 X |
| 5,165,457 | 11/1992 | Olin et al. | 4/431 X |
| 5,495,626 | 3/1996 | Lindroos et al. | 4/431 X |

FOREIGN PATENT DOCUMENTS

| | | |
|---|---|---|
| 458834 | 2/1975 | Australia . |
| 857323 | 9/1940 | France . |
| 2 366 186 | 4/1978 | France . |
| 85 24 28.8 | 1/1986 | Germany . |
| 164049 | 5/1990 | Norway . |
| 1379675 | 1/1975 | United Kingdom ............ 251/326 |

*Primary Examiner*—Gerald A. Michalsky
*Attorney, Agent, or Firm*—Sixbey, Friedman, Leedom & Ferguson; David S. Safran

[57] ABSTRACT

A valve particularly for vacuum drainage systems, comprising a valve housing (1) with an inlet (2), a through-flow part (11) and an outlet (3), and a device with an actuator for the opening and closing of the valve. The opening and closing device is a movable valve body (4) with a, relative to its axis, slightly inclined first sealing face stretching along the periphery of the valve body (4) up to a basically circular and, relative to the flow direction through the valve, vertical part comprising a second sealing face. The first sealing face is provided to rest against a corresponding inclined seat (16) being disposed on a projection in the valve housing and which seat is situated beyond the inner wall (36) of the through-flow part (11), and that the second sealing face is provided to be tightly resting against a corresponding circular, upper part (17) in the valve housing.

8 Claims, 3 Drawing Sheets

VALVE, PARTICULARLY FOR VACUUM DRAINAGE SYSTEMS

The present invention relates to a valve, particularly a flushing valve for vacuum drainage systems, comprising a valve housing with an inlet, a through-flow section and an outlet, as well as a device with an actuator for the closing and opening of the valve.

Drainage water from toilets contains particles such as paper and excrements. It is therefor of outmost importance that valves of the above-mentioned type is so designed that the particles do not accumulate inside the valve and thereby disturb its functioning. It is of further importance that such valves are simple and cheap to produce and maintain, open and closes rapidly, are water tight, last long and which are designed such that they produce very little noise when being used.

With a commonly used valve as disclosed in FR 2.366.186, the flow-through section is made from a flexible material which is provided to be pressed together for the closing of the valve. This valve solution responds to the above demands only to a minor extent as the life time for the valve is very short due to the flexible section being worn out in a relatively short time and because it needs quite a lot of maintenance. Besides, the valve has no noise reducing effect.

NO 164.049 reveals a solution with which the major intention is to reduce the noise of toilets being connected to vacuum drainage systems. The solution is based on using an additional valve in connection with the above-mentioned type of flushing valve to draw false air such that the suction effect from the toilet is reduced. Hereby the noise from the toilet is reduced and the velocity of the sewage in the drainage system is maintained, but the solution is very complicated and involves a great amount of components which needs a lot of space and is expensive to manufacture. The solution also requires an additional opening in the toilet for air supply, which complicates fire classification. Further, it is difficult to co-ordinate the two valves, and this will in turn lead to the accumulation of particles in the valve as such or in the drainage pipe form the toilet. Besides, an additional air pipe is used which is provided in the wall behind the toilet and which gives off noise that is transmitted to the toilet room or neighboring rooms.

With a valve according to the present invention there is provided a solution where all of the above-mentioned problems are avoided.

The invention is characterized in that the opening and closing device is a movable valve body with a, relative to its axis, slightly inclined first sealing face stretching along the periphery of the valve body up to a basically circular and, relative to the flow direction through the valve, vertical part comprising a second sealing face, which first sealing face is provided to rest against a corresponding inclined seat being disposed on a projection in the valve housing and which seat is situated beyond the inner wall of the flow-through part, and that the second sealing face is provided to be tightly resting against a corresponding circular, upper part in the valve housing.

The invention will be further described in detail by means of examples and with reference to the drawings in which.

Figure 1:
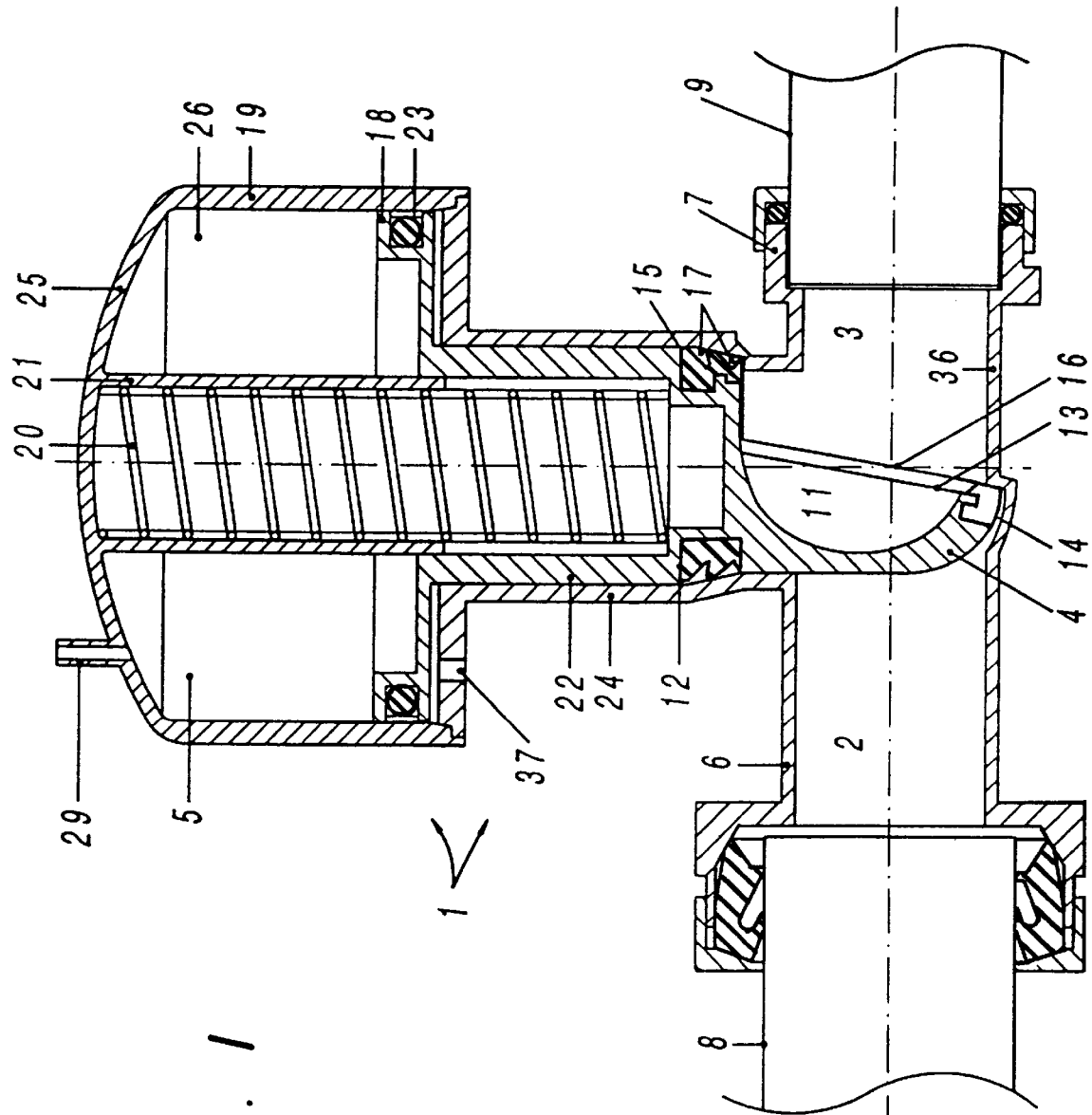
FIG. 1 shows an outline of a valve according to the invention.

The valve consists roughly, as shown in FIG. 1, of a valve housing 1, an inlet 2, an outlet 3 and a valve body 4 which is driven by an actuator 5. The in-and outlet 2,3 is preferably provided with flanges or other connecting means 6,7 for connecting the valve to a toilet or the like, respectively a drainage pipe 9 or the like. The valve body 4 which in FIG. 1 is shown in a closed position, has a design corresponding to a bowl, a spoon or the like for the lower part of it extending into the flow-through part 11 of the valve housing 1, and the convex side faces towards the inlet 2, whereas the concave side faces the opposite direction, towards the outlet 3. The spoon like part of the valve body is connected with a basically circular, vertically provided part 12, and the circular part 12 as well as the edge or face 13 of the spoon like part of the valve body are provided with recesses for sealing elements 14, 15 which are interlinked (both sealing elements and recesses per ce) to provide necessary sealing effect against the valve body. The sealing 14 rests against a seat 16 in the through-flow part of the housing when the valve body is in a closed position, as shown in FIG. 1, and thereby provides sealing against the housing in this area. The seat 16 is formed by a projection on the valve housing and stretches, as can be seen in FIG. 1, in a slightly inclined direction upwards along the periphery of the housing until it reaches the circular part 17, vis-a-vis the upper sealing element 15. The circular part 17 of the valve housing is slightly conical and thereby provides additional pressure against the sealing 15 to provide additional sealing effect when the valve body is in a closed position. The valve actuator is in the form of a piston/cylinder device 18,19, 20. The valve body 4 is connected with the piston 18 through a ring shaped connection 22 which also serves as a guide in a corresponding ring shaped part 24 in the valve housing. The piston on the other hand is movably provided in an upper, cylindrical part 19 and is provided with a sealing 23 against the wall of the cylindrical part 19. A spring 20 is disposed between the valve body and the top 25 of the cylindrical part and is provided to push the valve body downwards and in a sealing position against the support area 16. The spring is held in position within a downwardly protruding, cylindrical holder means 21. This holder means also function as a guide means for the connection 22 between the piston and valve body and improves the stability for the piston when it is moving.

The most common use of the valve will, as previously mentioned, be related to vacuum drainage systems, and in such case the valve could suitably be driven by means of vacuum through pipe or the like (not shown) being connected with the connector 29 on the valve house at one end and which via an opening/closing valve (neither not shown) is connected with a vacuum source, for example the drainage pipe 9.. When the piston moves upwards due to vacuum in the cylinder 26, the air from the surroundings will force its way through holes 37 in the bottom of the cylinder and the valve will open. Reversal, the valve will close by the force of the spring 20 when the connection with the vacuum source is "lifted" by the closing valve. Then air will be sucked in through the connector 29 from the surroundings and into the cylinder 26 on the upper side of the piston, whereas air on the opposite side of the piston will be forced out of the cylinder chamber via the opening 37.

Of course, the valve according to the invention may be driven by means of a pressure fluid, but in such case the pressure fluid would have to be supplied through the opening 37 in the bottom, and the drainage of the air would have to be done through the connector 29.

It is further, within the scope of the invention as defined in the claims, possible to use another type of actuator, but this will not be further described here.

Figure 2:
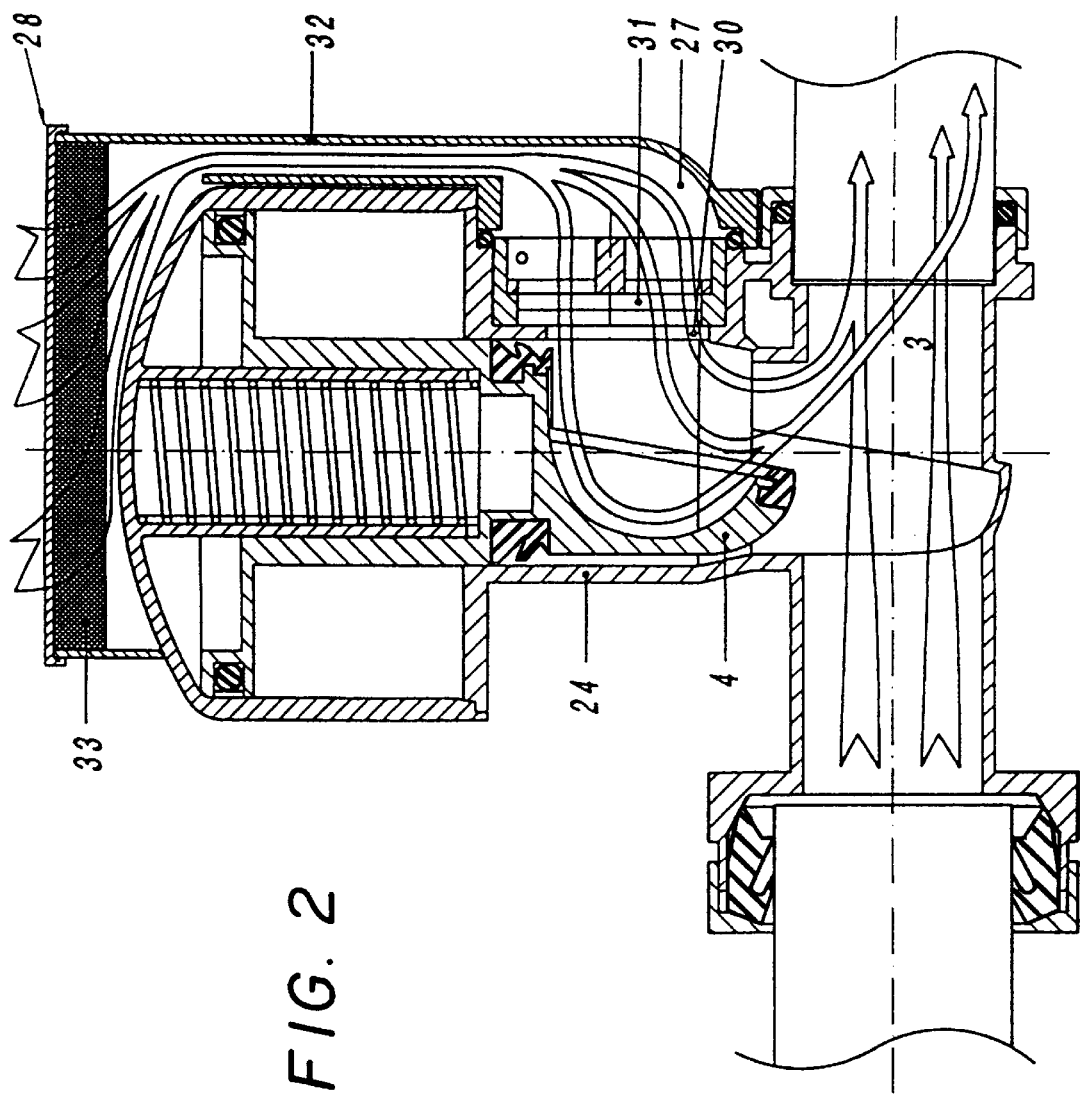
FIG. 2 shows an outline of an alternative embodiment of the same valve with a false air inlet and silencer.

FIG. 2 shows the same valve as is shown in FIG. 1, but with the modification that there is provided a false air inlet 27 and a silencer 28.

As previously mentioned there is a problem with vacuum toilets that noise is generated when the discharge valve of the toilet is open. This noise can, with the present invention, be vastly reduced by supplying false air through the separately provided false air inlet 27 which is an opening 30 in the ring-shaped part 24 of the valve housing, directly above the valve outlet 3. Preferably, the air inlet may be adjusted by means of an adjustable slide valve, damper, throttle valve 31 or the like.

As is apparent from FIG. 2, the opening 30 will be revealed when the valve body 4 is in its open position and the spoon-shaped design of the valve body will deflect the air being sucked in and direct it to the outlet 3. Hereby the flow of sewage from the toilet will not be disturbed. As also appears from FIG. 2, the seat 17 for the valve body 4 is disposed below the opening 30 such that the opening will be closed from the flow-through part 11 of the valve when the valve body is in a closed position.

The opening as such will substantially reduce the noise, but for further noise reduction a silencer 28 may be provided in connection with the valve housing in the form of a channel 32 which leads to a noise filter 33. Hereby the air will be sucked through the filter 33 via the channel 32 and into the false air inlet 27.

The foremost advantage with the invention is that there is provided a very simple, compact and cheap closing valve which has a long life time. Accelerated tests have been carried out with a valve made from POM plastics material corresponding to more than 700,000 closing and opening operations, and no essential wear or defects were found on the valve.

Figure 3:
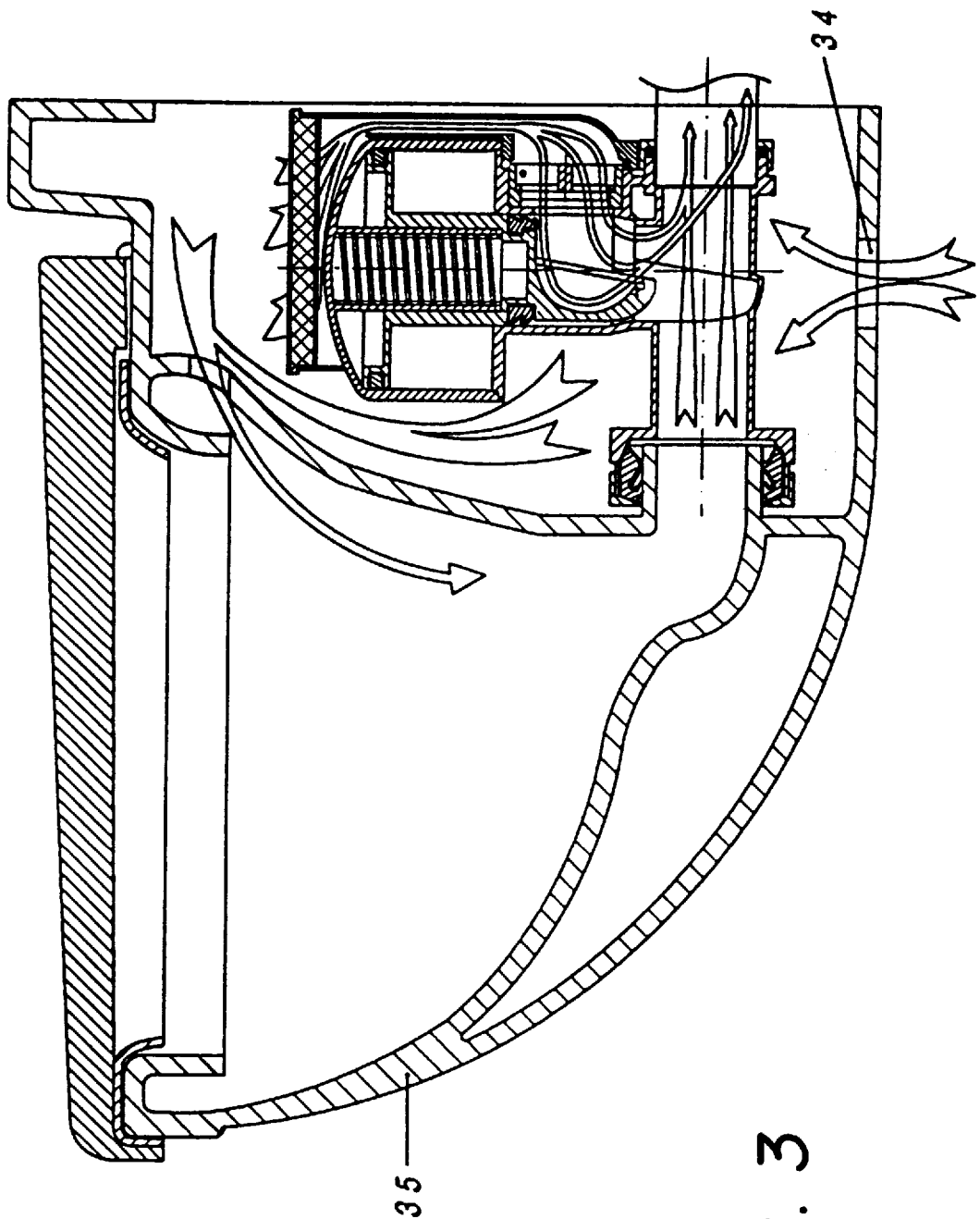
FIG. 3 shows the valve as shown in FIG. 2 being mounted in a toilet.

The fact that the valve is compact and small, can be seen from FIG. 3. As is apparent on this figure, the valve may easily fit into the rear part of a toilet, and access is easily obtained both for the replacement and maintenance of the valve. Air being sucked into the valve and the toilet bowl 35, is led th rough an opening 34 on the lower part of the toilet. On the known solution mentioned initially, a separate valve for the false air is used which does not fit into the toilet, and the air is sucked in through an air pipe stretching into the wall of the toilet room making noise that transmits to the toilet room as well as the neighboring rooms. With the solution according to the present invention an extra air pipe is not needed as the air, as previously mentioned, is drawn through openings in the bottom part of the toilet, and the problem with fire classification is eliminated.

The invention is not limited to a spoon-shaped valve body 4 as shown and described above. Thus the valve body may have another design as long as the valve face 13, with sealing 14 if needed, and the basically circular part of the valve body, with sealing 15 if needed, remains unchanged. The bowl or spoon like design of the valve body is necessary when the valve is supplied with a separately provided false air inlet as shown in FIG. 2, and the provision is to allow the passage of air and to direct it to the outlet of the valve as shown in this figure.

For the valve as shown in FIG. 1, which do not have false air inlet, the valve body may have another shape as mentioned above, and may for instance be flat or have convex shape in both directions.

Further the valve may be made from other materials than the one mentioned above and it may be used for other vacuum systems.

I claim:

1. A valve for vacuum drainage systems, comprising:
   a valve housing with an inlet, a flow-through part, an outlet and a circular upper part;
   an actuator device for opening and closing the valve;
   an inclined seat disposed on a projection in the valve housing extending from said circular upper part around a periphery of said flow-through part, said inclined seat being situated beyond an inner wall of said flow-through part; and
   a movable valve body which is movable along a valve axis between positions opening and closing the valve and includes a slightly inclined first sealing face and a basically circular horizontal part positioned horizontally relative to a flow direction through the valve;
   wherein said inclined first sealing face extends along a periphery of the valve body up to said circular horizontal part;
   wherein said circular horizontal part has a second sealing face; wherein said first sealing face is positionable against said inclined seat and said second sealing face is positioned tightly against said circular upper part in the positions of the valve body closing the valve; and wherein the valve body has a spoon or bowl like shape whereby its convex side is facing the inlet, and an edge of the spoon or bowl like shape forms the first sealing face of the valve body.

2. Valve according to claim 1, wherein the upper sealing part in the valve housing, corresponding to the circular sealing face on the valve body, has a downwards conical shape.

3. Valve according to claim 2, wherein the actuator for the movement of the valve body is in the form of a spring-loaded piston/cylinder device which is driven by means of vacuum.

4. Valve according to claim 3, wherein the piston of the piston /cylinder device is connected to the valve body via a basically ring-shaped or cylindrical part which is movably provided within a corresponding cylindrical part in the valve housing.

5. Valve according to claim 4, wherein the cylindrical part of the valve housing is provided with an opening directly above the valve outlet for the intake of false air when the valve body is in an open position.

6. Valve according to claim 5, wherein the opening is provided with a damper or throttle valve to control the false air supply.

7. Valve according to claim 6, wherein an air channel with a silencer is provided in connection with the air supply opening.

8. The valve according to claim 1, wherein said circular upper part comprises a cylindrical part and a slightly conical part, said conical part increasing the sealing pressure applied to the second sealing face when the valve is closed.

* * * * *